(12) United States Patent
Galicki et al.

(10) Patent No.: US 6,967,950 B2
(45) Date of Patent: Nov. 22, 2005

(54) PULL TRANSFERS AND TRANSFER RECEIPT CONFIRMATION IN A DATAPIPE ROUTING BRIDGE

(75) Inventors: Peter Galicki, Sugarland, TX (US); Cheryl S. Shepherd, Houston, TX (US); Jonathan H. Thorn, Gaithersburg, MD (US)

(73) Assignee: Texas Instruments Incorporated, Dallas, TX (US)

( * ) Notice: Subject to any disclaimer, the term of this patent is extended or adjusted under 35 U.S.C. 154(b) by 928 days.

(21) Appl. No.: 09/905,379

(22) Filed: Jul. 13, 2001

(65) Prior Publication Data

US 2002/0027912 A1 Mar. 7, 2002

Related U.S. Application Data

(60) Provisional application No. 60/224,913, filed on Aug. 11, 2000.

(51) Int. Cl.$^7$ .......................... H04L 12/28; G06F 15/16; G06F 15/76; G06F 13/24; G06F 13/32

(52) U.S. Cl. ...................... 370/392; 370/282; 370/285; 370/351; 370/389; 370/390; 370/409; 370/410; 370/419; 370/432; 709/201; 709/217; 709/218; 709/238; 709/242; 710/1; 710/38; 710/48; 710/260; 710/261; 710/266; 712/14; 712/16; 712/17; 712/18; 712/225

(58) Field of Search .......................... 712/10–12, 14, 712/16, 17, 18, 20, 32, 34–36, 40, 215, 225, 712/244; 370/278, 282, 285, 351, 389, 390, 370/392, 400, 401, 406, 409, 410, 419, 432, 370/449; 710/1, 3, 4, 38, 44, 46–48, 220, 710/260, 261; 709/266–268, 201, 238, 242, 709/245, 211, 212, 202, 203, 217, 218

(56) References Cited

U.S. PATENT DOCUMENTS

4,425,616 A * 1/1984 Woodell ...................... 718/107
5,036,458 A * 7/1991 Matsushima et al. ........ 712/244

(Continued)

FOREIGN PATENT DOCUMENTS

EP 0 817 092 A 1/1998

OTHER PUBLICATIONS

Rexford, J., et al.; *A Router Architecture for Real-Time Point to Point Networks*, Proc. Of the 23$^{rd}$ Annual Symposium on Computer Architecture, vol. 23, May 22-24, 1996, pp. 237-246.

Laudon, J., et al.; *The SGI Origin: A ccNUMA Highly Scalable Server*, Conf. Proc. Articles, 1997, pp. 241-251.

*Primary Examiner*—Kim Huynh
*Assistant Examiner*—Tanh Q Nguyen
(74) *Attorney, Agent, or Firm*—Robert D. Marshall, Jr.; W. James Brady, III; Frederick J. Telecky, Jr.

(57) ABSTRACT

In a network of digital signal processor nodes connected in a peer-to-peer relationship, a data packet sent to a node causes a return transmission from that node. The requester digital signal processor sends a data packet to a target digital signal processor. Upon arrival at the target digital signal processor, its receiver drives the arriving request packet into an I/O memory and triggers a transmitter interrupt. Next, the pull interrupt causes the transmitter to execute on a next packet boundary the pull request packet. Finally, the execution of the pull request causes the transmitter to pull a portion of the local I/O memory and send it back to the requester digital signal processor. The same physical portion of the I/O memory is overlaid with two logical uses, a receiver channel and a transmitter code block.

4 Claims, 9 Drawing Sheets

U.S. PATENT DOCUMENTS

| | | | |
|---|---|---|---|
| 5,361,363 A * | 11/1994 | Wells et al. | 712/22 |
| 5,519,699 A * | 5/1996 | Ohsawa | 370/231 |
| 5,710,935 A | 1/1998 | Barker et al. | |
| 5,732,086 A * | 3/1998 | Liang et al. | 370/410 |
| 5,793,768 A * | 8/1998 | Keshav | 370/400 |
| 5,796,738 A * | 8/1998 | Scott et al. | 370/401 |
| 5,826,033 A * | 10/1998 | Hayashi et al. | 709/238 |
| 5,959,995 A * | 9/1999 | Wicki et al. | 370/400 |
| 5,983,269 A * | 11/1999 | Mattson et al. | 709/221 |
| 6,091,710 A * | 7/2000 | Mawhinney | 370/236 |
| 6,167,027 A * | 12/2000 | Aubert et al. | 370/230 |
| 6,192,422 B1 * | 2/2001 | Daines et al. | 710/29 |
| 6,233,242 B1 * | 5/2001 | Mayer et al. | 370/412 |
| 6,295,573 B1 * | 9/2001 | Bailey et al. | 710/260 |
| 6,466,997 B1 * | 10/2002 | Ross et al. | 710/48 |
| 6,556,541 B1 * | 4/2003 | Bare | 370/235 |
| 6,564,277 B1 * | 5/2003 | Keen et al. | 710/268 |
| 6,680,915 B1 * | 1/2004 | Park et al. | 370/254 |
| 6,683,876 B1 * | 1/2004 | Tornes et al. | 370/395.1 |
| 2002/0031133 A1 * | 3/2002 | McWilliams | 370/401 |
| 2004/0028038 A1 * | 2/2004 | Anderson et al. | 370/386 |

\* cited by examiner

PULL TRANSFERS AND TRANSFER RECEIPT CONFIRMATION IN A DATAPIPE ROUTING BRIDGE

This application claims priority under 35 USC §119(e)(1) of Provisional Application No. 60/224,913, filed Aug. 11, 2000.

CROSS REFERENCE TO RELATED APPLICATIONS

This application is related to the following copending applications:

U.S. Provisional Application No. 60/224,607 filed Aug. 11, 2000 entitled DATAPIPE ROUTING BRIDGE, now U.S. patent application Ser. No. 09/905,378 filed Jul. 13, 2001; and U.S. Provisional Application No. 60/224,586 filed Aug. 11, 2002 entitled MULTIPROCESSOR NETWORK NODE FAILURE DETECTION AND RECOVERY, now U.S. patent application Ser. No. 09/904,991 filed Jul. 13, 2001.

TECHNICAL FIELD OF THE INVENTION

The technical field of this invention is data communication among a plurality of data processors.

BACKGROUND OF THE INVENTION

A datapipe routing bridge peripheral is composed of three building blocks, a transmitter, a bridge and a receiver. The main function of the bridge component is to provide high levels of connectivity between multiple digital signal processors without paying the penalties usually associated with inter-processor connections. The individual digital signal processors are connected with unidirectional point-to-point links from a bridge terminal on one digital signal processor to a bridge terminal on another digital signal processor. Depending on the real-time comparison of the packet header information with direction identification codes (IDs) stored inside the bridge, individual data transfer packets arriving at the bridge of each digital signal processor along the way are autonomously either absorbed into the local processor or, repeated out to the next processor or, simultaneously absorbed and repeated. The bridge can function in three modes of operation, point-to-point, broadcast and inter-cell modes. The inter-cell-mode allows communications between any number of digital signal processors in groups of 32 digital signal processors per group. The datapipe bus, carrying packet streams between the bridge components of multiple digital signal processors, has built-in signals for distinguishing between control and data elements on the bus, as well as a ready line that propagates against the flow of data to stop the flow upstream of a digital signal processor node that may be temporarily backing up. The datapipe bridge improves inter-digital signal processor traffic management over existing methods in following ways:

1. It eliminates external components and reduces the number of external pins dedicated to inter-processor communication, while removing any limitations on the scope of communication, packet size and the types of connection topologies.

2. It hides the space/time complexity of moving large amounts of data between many nodes over a fixed number of links by autonomously performing all routing functions without involving the local central processing units or direct memory access units.

3. It removes any limits on how many processors can be connected together.

4. It removes any limits on how many digital signal processors can receive the same data stream as it flows around the datapipe network (broadcast/cell mode).

5. It can multiplex data and control elements on the same transfer links between digital signal processors, improving inter-processor traffic management via the ability of control elements to configure or change the path for the data elements that follow. Previous methods had to use different mechanisms to transport control and data information, negatively impacting loading/synchronization or management of on-chip peripherals that could otherwise concentrate on processing the application.

6. It includes a "ready" signal which improves inter-processor traffic management by autonomously propagating a "not ready" condition against the flow of data, to manage congestion of some transfer link segments without involvement of any chip resources. This autonomous traffic management is better than the hands-on traffic management of previous methods, because it releases valuable chip resources from having to be involved in traffic management and instead allows them to fully concentrate of the application tasks at hand.

SUMMARY OF THE INVENTION

In conventional methods of inter-digital signal processor communication there is no direct mechanism for one digital signal processor to pull a block of data from the memory of another digital signal processor. In order to achieve a pull transfer, the current methods first pushes a pull request out to the target digital signal processor. Software in the target digital signal processor then evaluates the request and programs another push action from the target digital signal processor back to the requester digital signal processor. This effectively emulates a pull transfer operation.

The DATAPIPE ROUTING BRIDGE described in the above-cited U.S. patent application is an inter-processor communications peripheral, composed of three building blocks, a transmitter, a bridge and a receiver. This device provides a means to achieve pull transfers with simplified software and minimal central processing unit or direct memory access unit intervention.

The transmitter executes tx_opcodes from the requester digital signal processor I/O memory to transfer a block request to the I/O memory of the target digital signal processor. Upon arrival at the target digital signal processor, its receiver drives the arriving request packet into the I/O memory. The request is deposited in the pull channel of the target digital signal processor I/O memory. The pull channel is a circular receive buffer that has been configured to overlap with the "pull" area in I/O memory. The transmitter operation depends on the tx_opcodes servicing the pull interrupt to reside in that location as well.

This resulting interrupt is directly connected to a receiver event triggered by an event control byte appended to end of the pull request packet. Next, the pull interrupt causes the transmitter to execute on a next packet boundary the pull request packet containing a sequence of tx_opcodes. Finally, the execution of the pull request tx_opcodes causes the transmitter to pull a portion of the local I/O memory with a block tx_opcode and to send it back to the requester digital signal processor.

This automatic method of pulling a portion of the memory of one digital signal processor by another is implemented by tying one of the receiver events to a transmitter interrupt on the target digital signal processor. In addition, the same physical portion of the I/O memory is overlaid with two logical uses, a receiver channel and a transmitter tx_opcode block. The tx_opcode block includes a jump tx_opcode, pointing to the requested block in the I/O memory, and other tx_opcodes that form the header to guide the packet back to the requester digital signal processor.

The datapipe pull transfer method improves the existing methods of data pulls in following ways:

1. It releases the local central processing unit, direct memory access unit, on-chip peripherals and associated software from having to be directly involved in data pull transfers on both the requester and target digital signal processors. This frees up more digital signal processor cycles to process application data.

2. For systems that currently do not use pull transfers due to the potential complexity of implementation, the datapipe pull method increases system performance, simplifies software and decreases central processing unit and direct memory access unit loading.

Once the transfer of a block request to the I/O memory of the target digital signal processor is completed at the target, the receiver drives the arriving request packet with an embedded receipt confirmation packet into the I/O memory of the destination digital signal processor. The receipt confirmation packet, following right behind the data packet, is deposited in another area called the confirmation channel of the destination digital signal processor I/O memory. The confirmation channel is a circular receive buffer that has been configured to overlap with an area in I/O memory. Within this area the transmitter also expects to find residing the tx_opcodes servicing the transfer receipt confirmation interrupt.

This interrupt is directly connected to a receiver event triggered by an event control byte appended to the confirmation packet. Next, the confirmation interrupt causes the transmitter to execute on a next packet boundary the receipt confirmation packet containing a sequence of tx_opcodes. Finally, the execution of the confirmation tx_opcodes causes the transmitter to source a packet back to the original sender, informing it of the successful conclusion of the transfer. This automatic method of reflecting a portion of a packet arrival at the destination back to the transmitter as transfer confirmation is implemented by tying one of the receiver events to a transmitter interrupt on the target digital signal processor. In addition the same physical portion of the I/O memory is overlaid with two logical uses, a receiver channel and a transmitter tx_opcode block. This tx_opcode block includes a jump tx_opcode pointing to the requested block in the I/O memory, and other tx_opcodes that form the header to guide the packet back to the requester.

BRIEF DESCRIPTION OF THE DRAWINGS

These and other aspects of this invention are illustrated in the drawings, in which.

DETAILED DESCRIPTION OF PREFERRED EMBODIMENTS

Before describing the specific use conditions in the datapipe routing bridge (or simply "datapipe") which comprise the present invention, it will be helpful to review briefly the datapipe bridge peripheral function and the packet transfer flow which it can accomplish.

Figure 1:
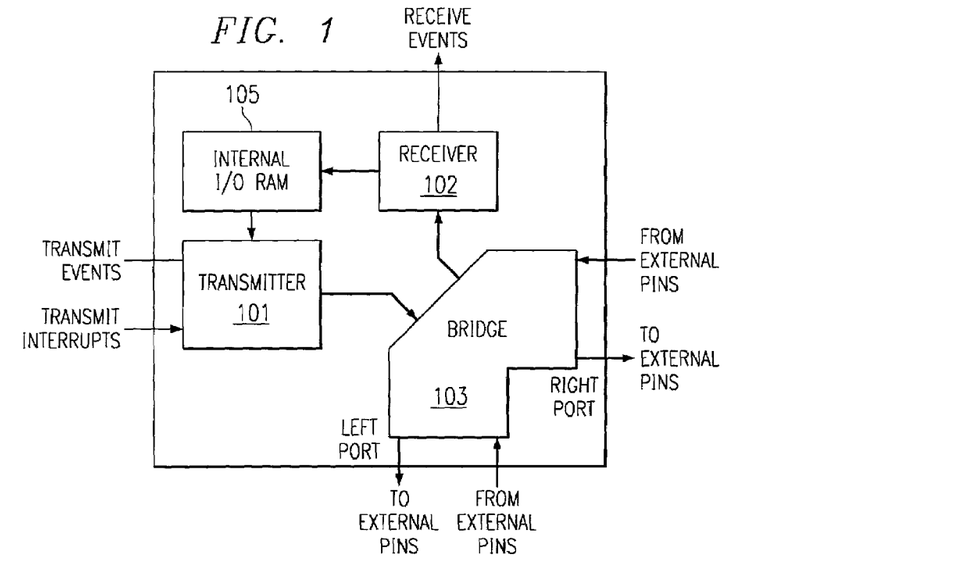
FIG. 1 illustrates the block diagram of a datapipe routing bridge peripheral.

FIG. 1 illustrates the makeup of a datapipe. It is composed of three building blocks transmitter 101, bridge 102 and receiver 103. The main function of the bridge component is to provide high levels of connectivity between multiple digital signal processors without paying the penalties usually associated with inter-processor connections. Dedicated routing logic within the datapipe autonomously navigates data packets of programmable size along the shortest distance from the source processor to one or more destination processors. Transmitter 101 may transmit data packets via bridge 103 to one or both of the right and left ports. Transmitter 101 responds to transmit events and transmit interrupts from an associated data processor (not shown) to supply data from internal I/O memory 105 to bridge 103. Bridge 103 is capable of retransmitting a data packet received at one of the right or left ports to the other port. Bridge 103 may also transfer a received data packet to receiver 102 in addition to or instead of retransmission at the other port. The actions of bridge 103 are determined by a header of the data packet. Upon receipt of a data packet, receiver stores the received data in internal I/O memory 105 and may generate a receive event to the associated data processor. In the preferred embodiment the associated data processor is a digital signal processor.

Figure 2:
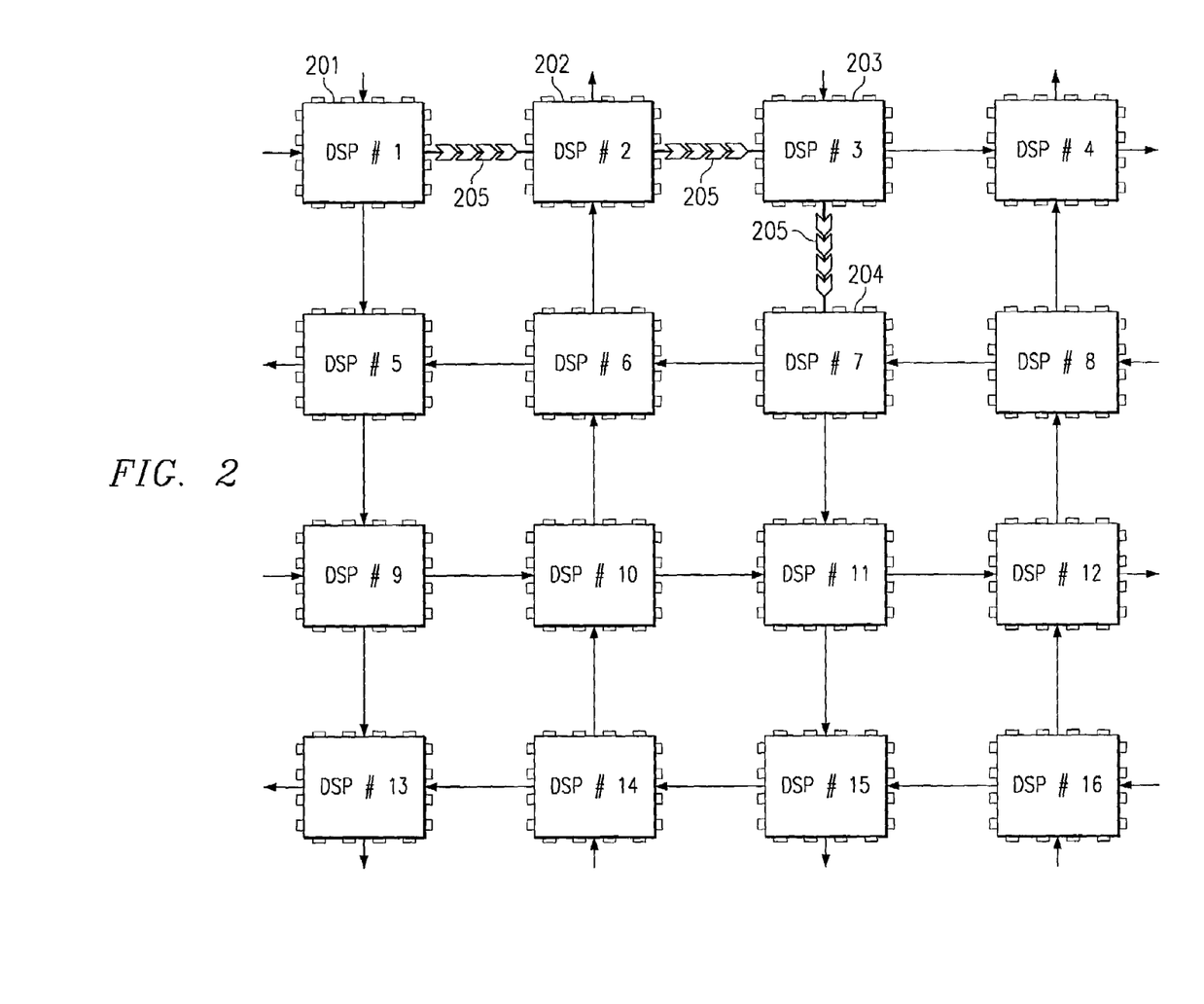
FIG. 2 illustrates an array of multiple processors connected in a datapipe network.

FIG. 2 illustrates an array of multiple digital signal processors connected in a datapipe network. Each intermediate processor 202 and 203, between source processor 201 and destination processor 204 repeats the packet to the next processor through dedicated point-to-point uni-directional links 205. Each link contains a 16-bit data bus, its own transfer clock and a ready signal. The links 205 also contain a 2-bit control signal identifying the data content (at the rising edge of the transfer clock) as a packet body or a control opcode used by the datapipe routing logic to navigate the packet to its destination.

Figure 3:
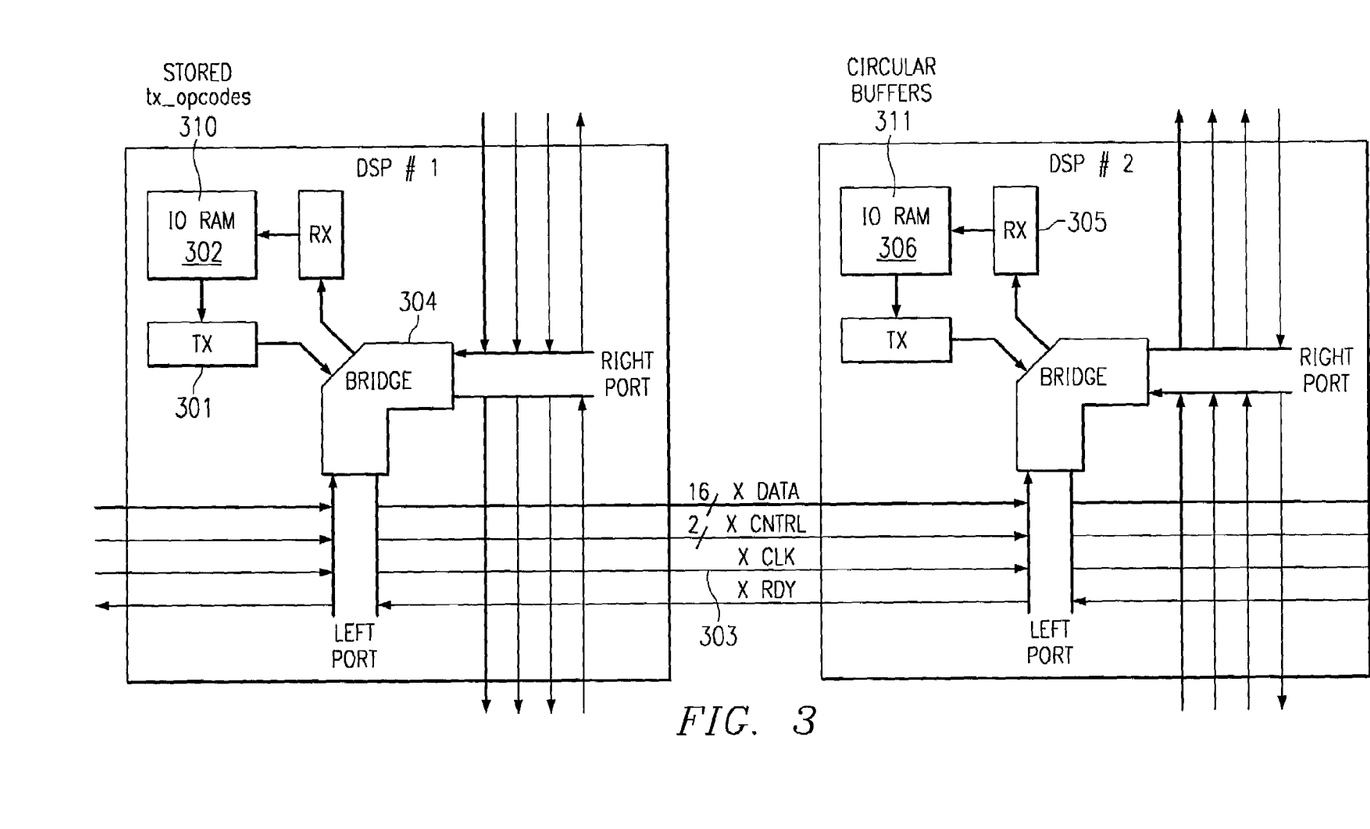
FIG. 3 illustrates a single communications link between two digital signal processors using a datapipe routing bridge peripheral.

FIG. 3 illustrates the three components of the datapipe hardware at each terminal node and their connection to the datapipe network in an example data transfer. The transmit controller 301 drives the packets from internal I/O RAM 302 out the pins 303 to the links connecting the digital signal processors. The communications bridge 304 routes each packet into or around each digital signal processor node on the network. For each packet routed into a node from the network, the receive unit 305 pushes the packet into the local I/O RAM 306 of the destination digital signal processor. Both of the two external ports of the bridge feature two unidirectional channels, one for input and one for output.

Both transmitter and receiver can send communications events to the interrupt selectors in the associated digital signal processor. The transmitter can also respond to interrupts from the interrupt selector. The receiver can also send an interrupt directly to the transmitter.

The datapipe uses internal I/O RAM 306 for temporary storage of outgoing data and for buffering of the incoming data. The datapipe transmitter 301 uses the internal I/O RAM 302 to store tx_opcodes 310 instructing it what blocks to transfer and their locations within internal I/O RAM 302. The datapipe receiver deposits incoming packets into dedicated internal I/O RAM 306 circular buffers 311.

Figure 4:
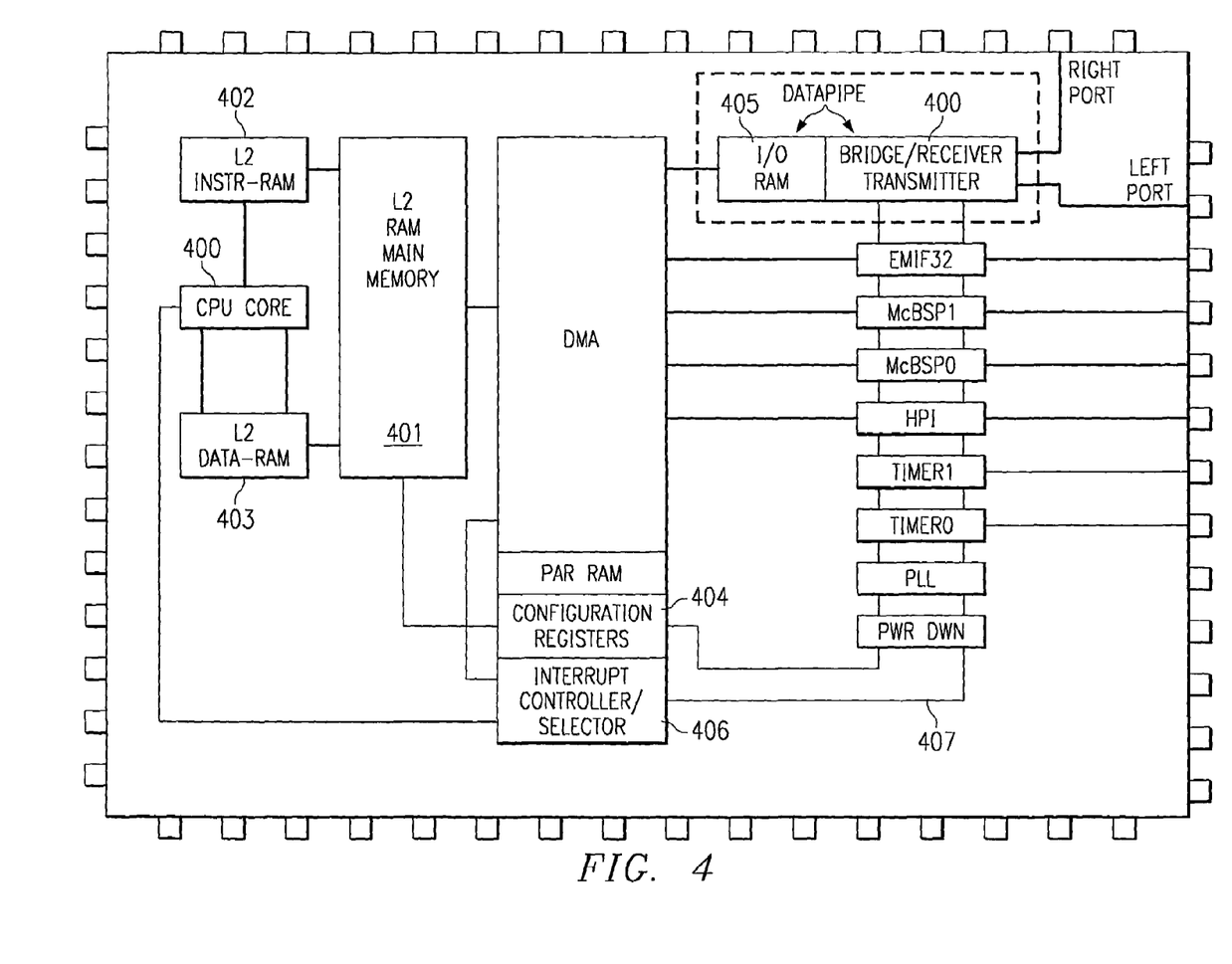
FIG. 4 illustrates the a datapipe routing bridge peripheral within a conventional digital signal processor chip.

FIG. 4 illustrates the datapipe within a conventional digital signal processor integrated circuit. Internal I/O RAM input buffers 405, when almost full, send an event to the chip direct memory access (DMA) unit to move the data into the level-2 (L2) main memory 401, where it can be accessed directly by the central processing unit core 400. Note that this application contemplates that central processing unit core 400 is a digital signal processor, however this invention is equally applicable to a general purpose data processor. Internal I/O RAM 405 of the datapipe is split into two independent blocks for simultaneous direct memory access unit and datapipe access. The direct memory access port servicing internal I/O RAM 405 and the datapipe looks exactly like the other direct memory access ports driving the remaining chip peripherals.

Collecting small amounts of I/O data outside of L2 memory and bringing it into L2 in larger blocks, increases direct memory access efficiency and decreases the probability of central processing unit/direct memory access conflicts inside the L2. The datapipe configuration registers 404 and interrupt registers 406 are memory mapped in the configuration space. The datapipe receiver and transmitter events are carried by a bus 407 to the interrupt registers 406, where some of the same receiver events can be bounced back to the transmitter in the form of datapipe transmit interrupts.

The datapipe interrupt flag/enable registers which are a part of the digital signal processor interrupt selector/controller 406 and the datapipe configuration registers 404 are memory mapped in the configuration bus space. Each digital signal processor with one datapipe peripheral has two receive channels and two transmit channels. One receive channel on processor A connects to one transmit channel of processor B, and conversely the second transmit channel on processor B connects to the second receive channel of processor A.

Figure 5:
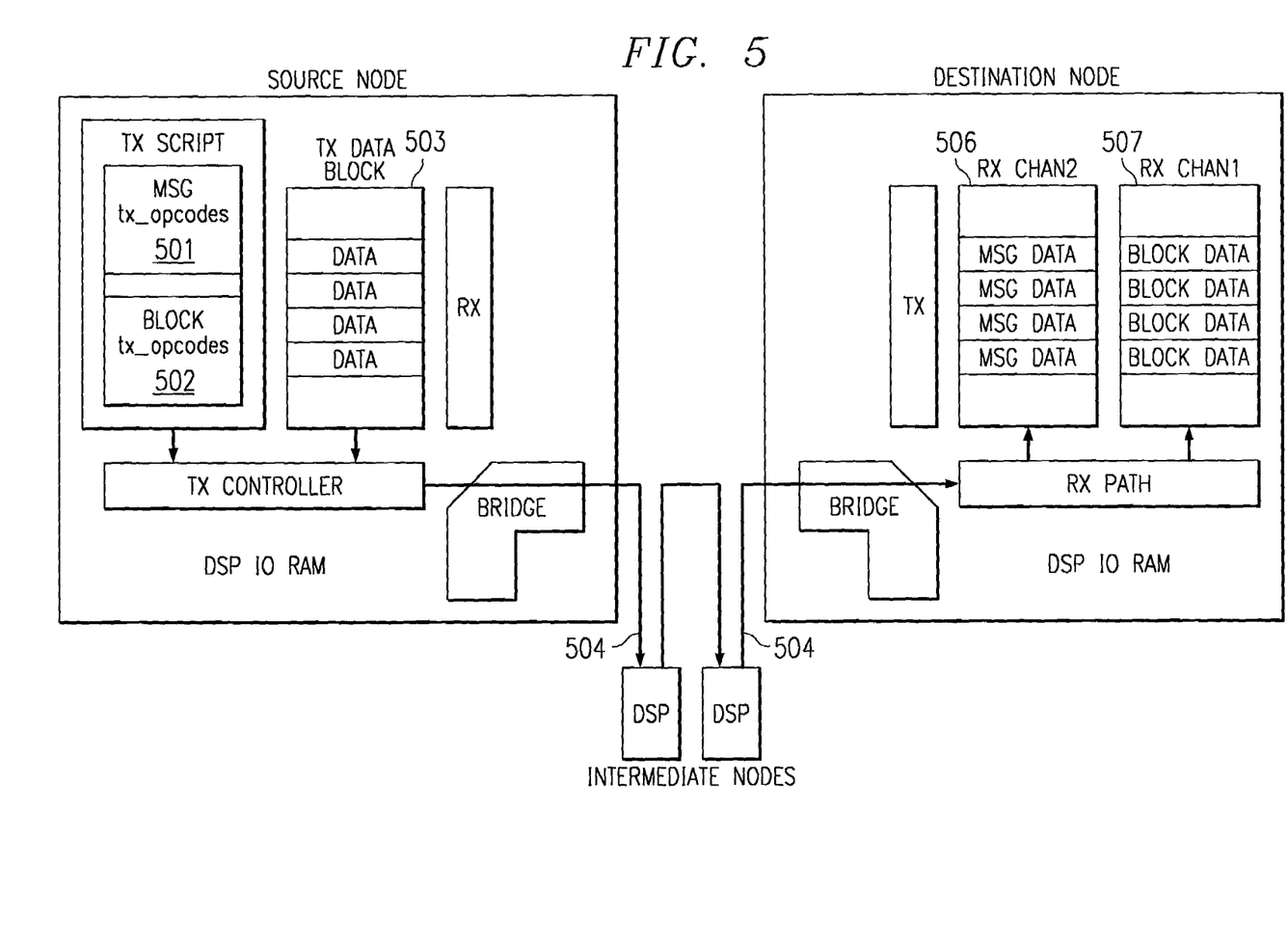
FIG. 5 illustrates an example of a packet transfer.

Refer to FIG. 5 which illustrates an example of a packet transfer. A typical transfer starts at the source digital signal processor where a packet is injected into the datapipe network through one of the transmit channels. The header preceding the packet content contains information about one or more destinations for the packet. As the packet enters each node, the header is examined with reference to the local identification code (ID) registers inside the datapipe bridge. The bridge left and bridge right ID registers have knowledge of the location of all other processors within a communications cell of up to 32 processors. The packet may be accepted into the node, routed back out through the left or right port, whichever is closer to the destination encoded in the header, or both accepted into the node and routed to the port. Broadcast packets can navigate to multiple destinations.

Each transfer starts by the transmitter fetching a 32-bit tx_opcode from a transmit script inside the I/O RAM and interpreting the encoded transfer similarly to the way a central processing unit interprets an instruction to operate on data. Instead operating on the data, the transmitter sends the data out to another digital signal processor across the local bridge and through the datapipe network.

There are two different ways that a tx_opcode can cause a data packet to be injected into the datapipe network. These are by way of (1) a MSG transfer 501 or (2) a BLOCK transfer 502. A MSG tx_opcode 501 contains embedded data or rx_opcodes that are immediately transferred out without referencing any additional I/O RAM location. This is analogous to a central processing unit operating on the immediate data unit embedded inside an instruction. A BLOCK tx_opcode 502 causes the transmitter to transfer a block of data 503 from a different local I/O RAM location, whose address has been previously loaded into the transmitter address register with other tx_opcodes preceding the BLOCK tx_opcode. This is analogous to an indirect addressing mode used by central processing unit instructions to access data whose address exists in a register. In either case, the MSG transfer or the BLOCK transfer, the packet was injected into the datapipe network by the transmitter and the packet header guides it across the network to one or more destination nodes on the way to the final destinations (MSG transfer 506 and BLOCK transfer 507).

Similarly, the EVENT rx_opcode may also be recognized by the receiver of the destination node, which copies the upper three bits of the EVT field to the corresponding three interrupt flag bits inside the datapipe interrupt flag register. This register, if enabled, could alert the destination central processing unit that a certain packet has just been deposited inside the local I/O RAM. The datapipe interrupt flag register is located inside the digital signal processor interrupt controller.

Figure 6:
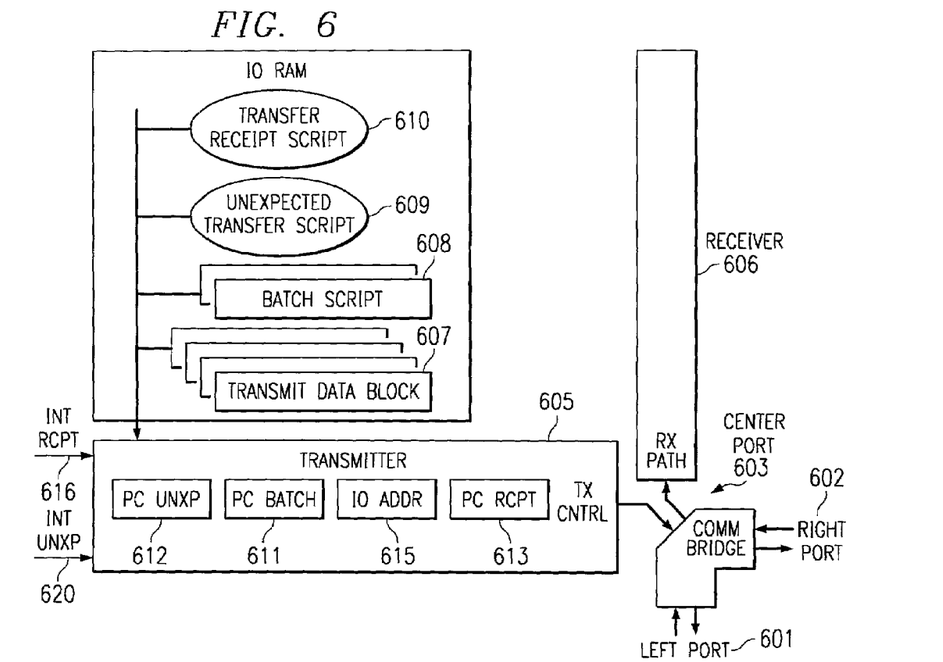
FIG. 6 illustrates transmission of packets from a source I/O RAM.

FIG. 6 illustrates transmission of packets from a source I/O RAM. Each communications node on the datapipe network connects to the network by means of a bridge component. Each bridge has three ports: a left port 601; a right port 602; and a center port 603. While left port 601 and right port 602 are external and connected to integrated circuit pins, center port 603 is internal and connected to the local transmitter 605 and local receiver 606. Each node digital signal processor uses transmitter 605 to inject packets into the network and uses receiver 606 to push the arriving packets into its local I/O RAM.

After each packet header enters the bridge through left port 601 or right port 602, the header is evaluated. The destination information inside the header is evaluated with the resident left and right ID (inter-node direction) registers to route the packet out of the bridge toward the packet destination. The bridge may route the packet to left port 601, right port 602 and center port 603. Depending on the header evaluation, the point-to-point and cell packets may be routed out the bridge through left port 601, right port 602 or center port 603. Broadcast packets can exit the bridge into the node through center port 603 and at the same time can also be repeated out to other nodes through left port 601 and/or right port 602.

Each bridge component uses three registers, three comparators and one decoder to route the packet to one or more of its three output ports. As each packet header enters the bridge, a 5-bit DST_NODE field is compared with the 5-bit resident NODE_ADDR to evaluate the center match. A center match condition is typically used to allow a packet to enter the node through center port 603.

The 5-bit DST_NODE may also be decoded into a 32-bit ID_DST value which is then compared with the ID_RIGHT and ID_LEFT resident registers to evaluate the right and left match conditions. The 32 bits of the ID_DST register represent 32 digital signal processor nodes (numbered from 0 to 31) that comprise a single communications cell. A packet traveling to the digital signal processor node 7 will be represented by the DST_NODE value of 07Hex and the ID_DST value of 80Hex (bit 7 is high and all other bits are low). A resident ID_LEFT register may have a value of 414Hex. This value means that in order to reach digital signal processor nodes 2, 4 and 10 (inside the local cell), the packet should be routed out of the left port of the bridge. The ID_RIGHT register value of 313C0Hex implies that the shortest path to digital signal processor nodes 6, 7, 8, 9, 12, 16 and 17 is through the right port of the bridge. The OR-ed bit-wise AND function of the left and right comparators yield a right match and left miss-match between the packet destination ID and the bridge direction registers, causing the packet to be routed out through the right port of the bridge.

Depending on the type of the packet that is passing through the bridge (PTP, BCAST or CELL) the comparator results may be processed in different ways to make the routing decisions compatible with those packet types.

Before being injected into the datapipe network, each transfer packet is first assembled inside the datapipe transmitter from a combination of tx_opcodes and pure data blocks, both located inside the local I/O RAM. The tx_script contains data transfer instructions (tx_opcodes) for the transmitter controller to initiate the transfers. Portions of the 32-bit tx_opcodes contain 8-bit rx_opcodes with encoded network destination(s) information for the packet header. Other parts of the tx_opcodes contain pointers to the actual data blocks inside the source node's I/O RAM. A transfer packet is formed when a packet header is injected into the datapipe network, followed by the data block itself and then a tail. Each tail is typically composed of one EVENT rx_opcode, which upon arrival at the destination node can cause an interrupt to the central processing unit announcing the arrival of the packet. The EVENT rx_opcodes are also used by the bridge routing logic and transmitter output ports to recognize boundaries between packets.

The rx_opcodes in the packet header and tail guide the packets with their data contents across each node's bridge routers to one or more destination nodes on the datapipe network, one link at a time. Upon arriving at the destination node, the bridge sends the packet into that node through its center port, across the receiver and into the local I/O RAM. Before the data is placed in memory, some of the header rx_opcodes may instruct the receiver to activate one of several available channels, to store the data starting at the current location within that channel. The receive channels represent distinct and contiguous blocks in I/O RAM where the similar kinds of data may be deposited together. For example, pure application data may be collected in one channel, while the control data describing the content of the application channel may be collected in another channel. The control data is later used by the central processing unit to navigate through the application channel to determine what data has arrived and what processing is required.

FIG. 6 illustrates transmission of packets from a source I/O RAM. The datapipe transmitter 605 can directly address four separate regions of the I/O RAM. Three of these regions 608, 609, and 610 are referred to as output programs or tx_scripts, as they contain tx opcodes that are used by the transmitter to drive the transfers. Each tx_script is represented by a dedicated 32-bit output program counter inside the transmitter. The three program counters are PC_BATCH counter 611, PC_UNXP counter 612 and PC_RCPT counter 613. The fourth I/O RAM region that is directly accessible by the transmitter is transmit data block 607, which holds the application data currently being transmitted out. Inside transmitter 605, the current data block is represented by a single 32-bit IO_ADDR register 615. During typical operation, transmitter 605 is traversing the batch tx_script stored in batch script portion 608 of I/O RAM containing information describing all expected transfers for the current frame. Processing of the individual tx_opcodes inside the batch tx_script causes transmitter 605 to inject transfer packets into the datapipe network. Occasionally a need will arise to send out a packet that has not been previously pre-packaged in the form of the batch tx_script. These unexpected transfer can be injected into the datapipe network in between individual batch packets, by first assembling the tx_opcodes (that will drive the unexpected packets) inside the UNXP portion 609 of the I/O RAM, and then issuing the INT_UNXP 620 interrupt to cause the transmitter to temporarily suspend the batch packets and process the unexpected script. The RETIX tx_opcode at the end of the UNXP tx_script causes the transmitter to resume processing of the batch tx_script, and once again drive the datapipe network with the application data. While the unexpected transmit channel is typically controlled by the central processing unit needing to get an urgent message out, the receipt channel with the associated PC_RCPT program counter and INT_RCPT 616 interrupt is controlled by the receiver on the same node to interrupt the batch transfers in order to send out a packet receipt confirmation back to a remote sender.

Figure 7:
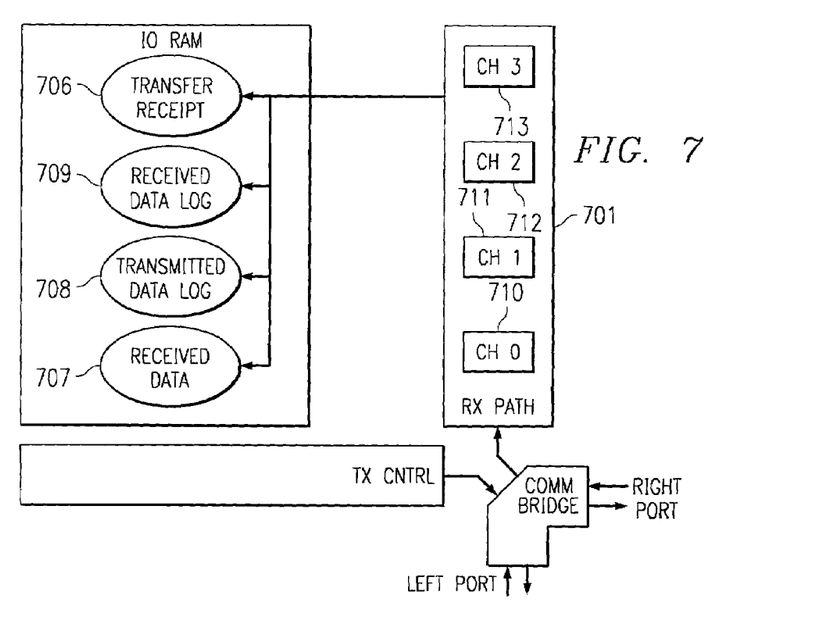
FIG. 7 illustrates reception of packets at destination I/O RAM.

FIG. 7 illustrates reception of packets at destination I/O RAM. The datapipe receiver 701 can directly address four regions of the destination node I/O RAM numbered 706, 707, 708, and 709. The four destination regions, referred to as receive channels, are each represented by a dedicated 32-bit address register inside the receiver. The four channels, typical multi-processing applications, are receive data buffer 707, receive data log 709, transmitted data log 708 and transfer receipt buffer 706. Receive data buffer 707 collects the received application data. Receive data log channel 709 contains information for the central processing unit concerning what is in the receive data buffer and what to do with it. Transmitted data log 708 contains information for the central processing unit concerning what previously transmitted packets from this node have been positively confirmed to have arrived at their destinations. Transfer receipt buffer 706 represents a temporary storage for portions of newly arrived packets that have been designated to be bounced back to their source node by the local transmitter as receipt confirmation packets.

During typical operation, data packets arriving to the receiver from the center port of the local bridge are packed into words and transferred to the local I/O RAM at the current address of the active receive channel. There can be only one active channel at any one time, so a packet that wants to deposit its data into a specific channel, should contain a CHAN rx_opcode in its header to activate the correct channel before the body of the packet reaches the receiver.

Figure 8:
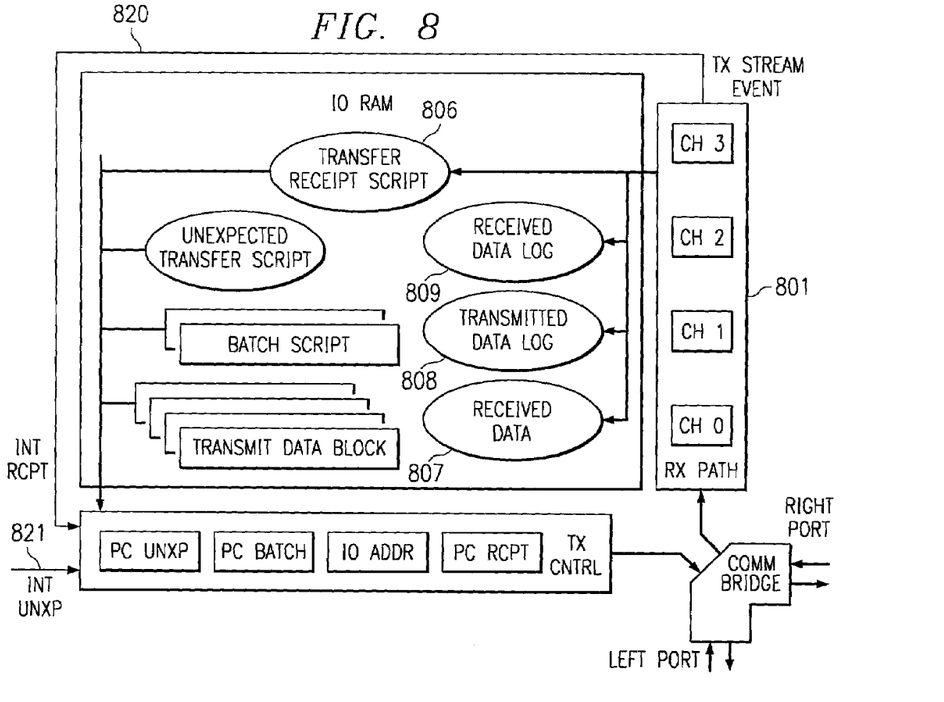
FIG. 8 illustrates a simplified view of transfer confirmation.

FIG. 8 illustrates a simplified view of transfer confirmation. Taking into account that both the datapipe receiver and the transmitter use the same I/O RAM to buffer data and transfer opcodes, it is possible to bounce a portion of the incoming packet back to the sender as a transfer confirmation packet. Typically, the destination receiver 801 parses the incoming packets into the separate received data 807 and received data log channels 809, based on the state of the CHAN rx_opcode contained in the header of each packet. A third channel could be activated at the beginning of each confirmation packet, following the data and the data log packets. Transfer receipt channel 806 collects the confirmation packet until the packet tail has reached the receiver. This tail contains an EVENT rx_opcode that causes the receiver to output a stream event 820 which is converted to an INT_RCPT interrupt 821, if enabled, and driven into the transmitter section of the local datapipe. The INT_RCPT interrupt 821 causes the transmitter to source a packet as described by the tx_opcodes inside the transfer receipt script. In order for the transmitter to automatically bounce a message back to the sender of the confirmation packet, the receiver transfer receipt channel has to overlap with the transmitter transfer receipt script, which is then interpreted by the transmitter to send back a confirmation message embedded inside the transfer receipt script tx_opcodes. That confirmation packet is preceded by a CHAN1 rx_opcode that causes the receipt to be deposited in the transmitted data log 808 of the original sender. All that the sender now has to do is to periodically check the contents of the transmitted data log 808 to verify that all the previously transmitted data has actually been delivered.

Figure 9:
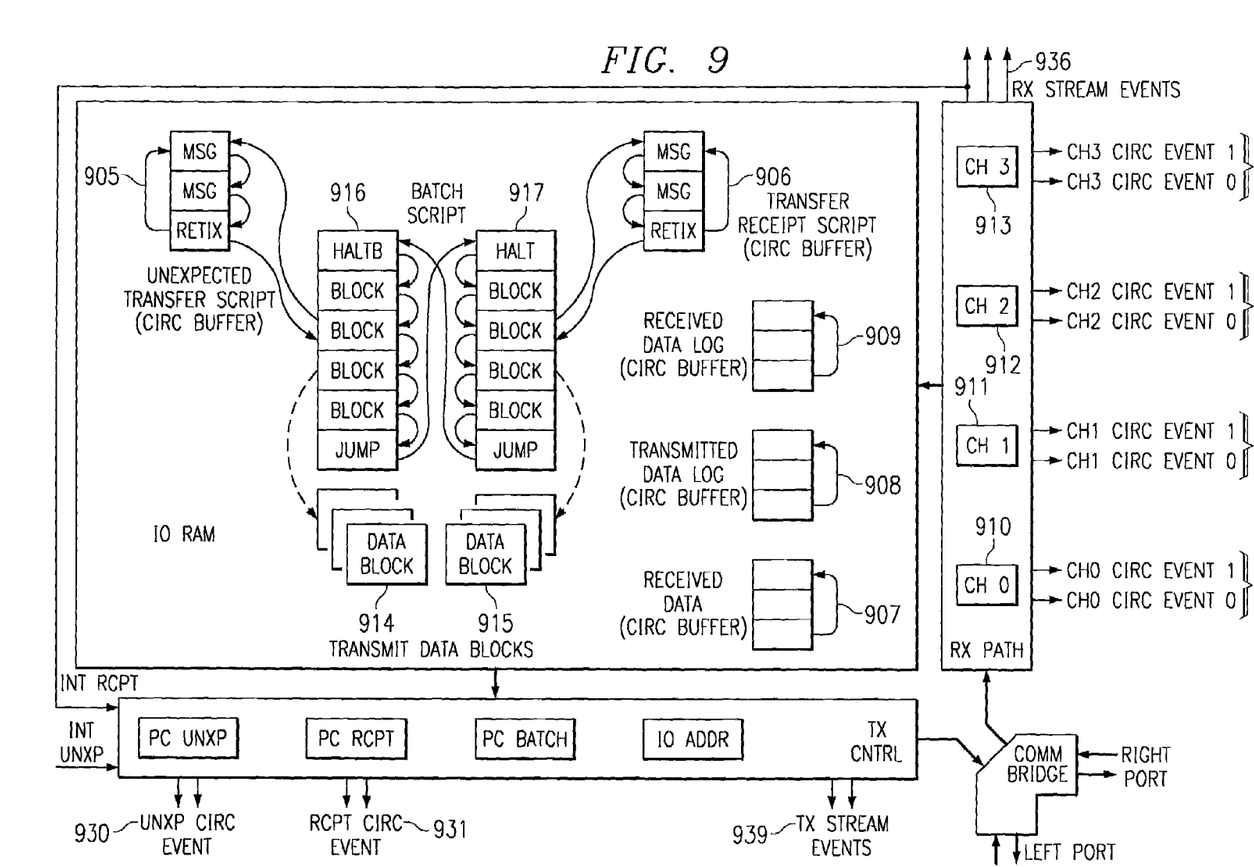
FIG. 9 illustrates a more detailed view of the transfer confirmation sequence.

FIG. 9 illustrates, in further detail, the processes relating to transfer receipt confirmation. During typical operation the datapipe receiver collects the data streams arriving from the local bridge into four channels 910, 911, 912, and 913. Each of these four channels represents a distinct portion of the I/O RAM. Since it is hard to predict which portion of the I/O RAM will be sending the data, the amount of data and when the data will arrive, all receiver input channels are configured as circular buffers with programmable buffer size. Each channel address register senses when the buffer cycles through a chosen address, at which time a circular interrupt is sent to the central processing unit to empty the buffer up to that address. Two diametrically opposed circular interrupts per buffer give the central processing unit time to respond in time without fear of losing data. On the transmitter side both unexpected buffers (unexpected transfer script 905 and transfer receipt script 906) are also configured as circular buffers with programmable buffer size. This is, once again, because the data going though those buffers is not predictable in size or time. The associated four circular events can keep the central processing unit informed on when to best refill the unexpected transfer buffers without risking stepping on the yet not processed tx_opcodes. The batch script 916, 917 and all transmit data blocks 914 and 915 are linear and not circular, because their size and time of processing/transfer are known well in advance of the actual transfers.

Giving the batch script further consideration, one can see that it is actually divided into two scripts 916, 917 connected with the JUMP tx_opcode. JUMP actually represents a series of INITX tx_opcodes initializing the PC_BATCH program counter between frames. Many real-time digital signal processor applications use a double-buffered or ping-pong technique of transmitting previously computed data from one buffer, while the central processing unit is sourcing the current data out of another. When the old frame concludes and the new frame starts, the pointers to the buffers are switched to minimize copying of data. After sending out the packets described in one portion of the batch script representing one frame, the JUMP tx_opcode causes the transmitter to move on to another block of I/O RAM representing the next frame transfers. The HALT tx_opcode at the beginning of each batch tx_script insures that the datapipe does not start sending out new packets until the central processing unit restarts the halted transmitter at the start of the new frame. This is done by setting the TX_ENB bit inside the datapipe configuration/status register.

The batch script can also be disabled at any time manually, by the central processing unit deasserting the TX_ENB bit inside the datapipe configuration/status register. Likewise the unexpected transfer script and the transfer receipt script, can be suspended by deasserting the INT_UNXP and INT_RCPT interrupt enable bits in the datapipe interrupt enable register. The unexpected transfers can be reactivated by writing a logical "1" to the same bit locations.

In addition to eight receiver events (four pairs labeled 920, 921, 922 and 923) and four transmitter circular events (two pairs labeled 930 and 931), the receiver can also trigger three stream events 936 and the transmitter can trigger two stream events 939. The stream events flag to the central processing unit when an EVENT packet, usually appended at the end of a data packet, leaves the source transmitter and enters the destination receiver. The five stream events provide just another way for the central processing unit to keep track of what packets are leaving and what packets have just arrived.

Figure 10:
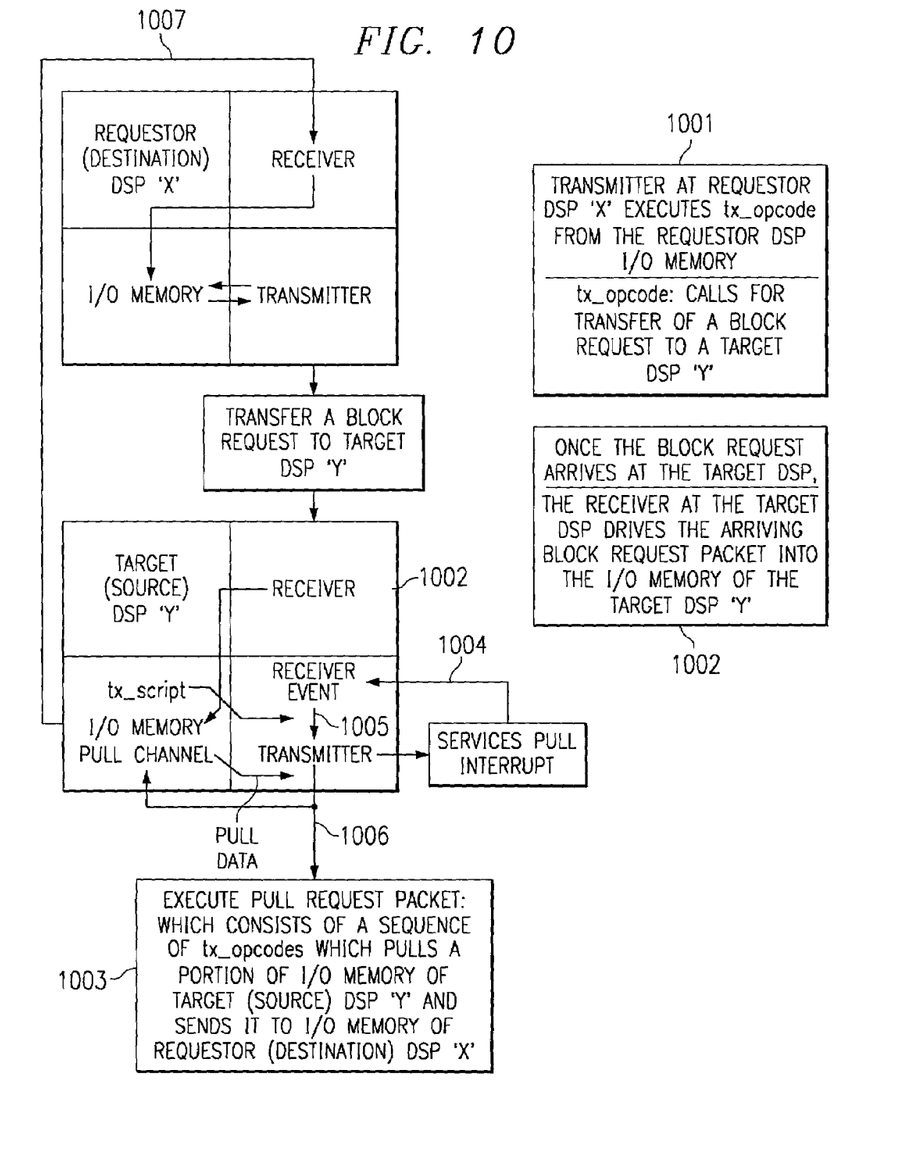
FIG. 10 illustrates the pull transfer sequence.

FIG. 10 illustrates the pull transfer sequence. The transmitter at the requester (destination) digital signal processor 1001 executes tx_opcodes from the requester digital signal processor I/O memory to transfer a block request to the I/O memory of the target (source) digital signal processor. Upon arrival at the target (source) 1002, the receiver drives the arriving request packet into the I/O memory of the target (source) digital signal processor. The request is deposited in the pull channel of the target digital signal processor I/O memory. The pull channel is a circular receive buffer that has been configured to overlap with an area in I/O memory. The transmitter operates 1003 depending on the tx_opcodes servicing the pull interrupt 1004 to reside in that location as well.

This resulting interrupt is directly connected to a receiver event 1005 triggered by an event control byte appended to end of the pull request packet. Next, the pull interrupt causes the transmitter to execute (on next packet boundary) the pull request packet 1006 containing a sequence of tx_opcodes. Finally, the execution of the pull request tx_opcodes causes the transmitter to pull a portion of the local I/O memory (with a block tx_opcode) and to send it back 1007 to the requester digital signal processor.

This automatic method of pulling a portion of the memory of one digital signal processor by another digital signal processor is implemented by tying one of the receiver events to a transmitter interrupt (on target digital signal processor). In addition, the same physical portion of the I/O memory is overlaid with two logical uses: a receiver channel; and a transmitter tx_opcode block. The opcode block includes a jump tx_opcode pointing to the requested block in the I/O memory and other tx_opcodes that form the header to guide the packet back to the requestor.

The datapipe pull transfer method improves the existing methods of data pulls in following ways:

1. It releases the local central processing unit, direct memory access, on-chip peripherals and associated software from having to be directly involved in data pull transfers on both the requester and target digital signal processors. This frees up more digital signal processor cycles to process application data.

2. For systems that currently do not use pull transfers due to the potential complexity of implementation, the datapipe pull method increases system performance, simplifies software and decreases central processing unit/direct memory access loading.

Figure 11:
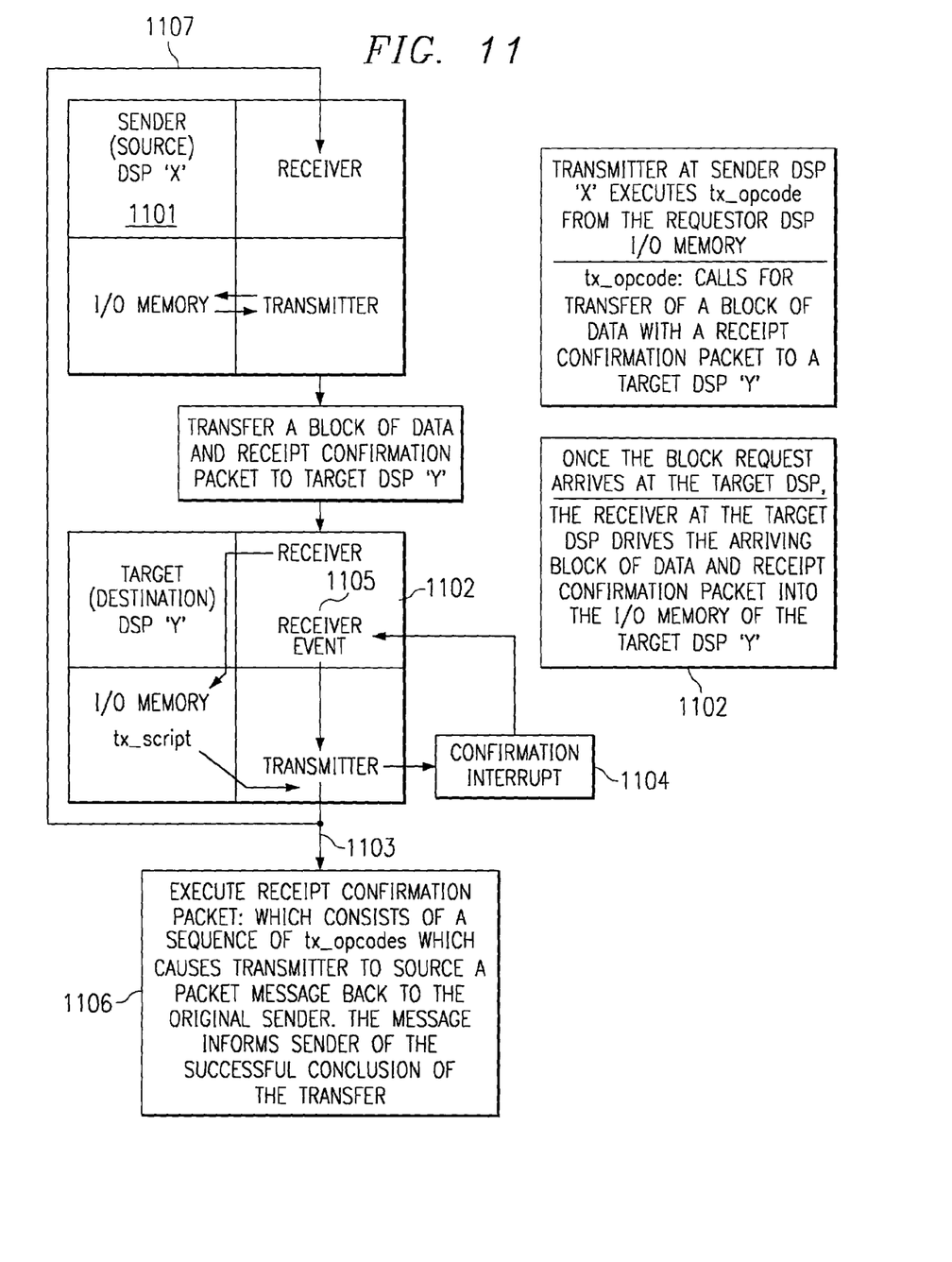
FIG. 11 illustrates the transfer receipt confirmation sequence.

FIG. 11 illustrates the transfer receipt confirmation sequence. Once the transfer of a block of data is completed at the I/O memory of the target (destination) digital signal processor, the receiver 1102 drives the arriving request packet into the I/O memory of the destination digital signal processor.

The receipt confirmation packet, following right behind the data packet, is deposited in another area (confirmation channel) of the destination digital signal processor I/O memory. The confirmation channel is a circular receive buffer (a portion of the transfer receipt script buffer 906 in FIG. 9) that has been configured to overlap with an area in I/O memory. Within this area the transmitter also expects to find residing the tx_opcodes servicing the transfer receipt confirmation interrupt.

This confirmation interrupt 1104 is directly connected to a receiver event 1105 triggered by an event control byte appended to the confirmation packet. Next, the confirmation interrupt causes the transmitter to execute (on next packet boundary) the receipt confirmation packet 1106 containing a sequence of tx_opcodes. Finally, the execution of the confirmation tx_opcodes causes the transmitter to source a packet back 1107 to the original sender, informing it of the successful conclusion of the transfer. This automatic method of reflecting a portion of a packet arrival at the destination back to the transmitter as transfer confirmation, is implemented by tying one of the receiver events to a transmitter interrupt on the target digital signal processor. In addition the same physical portion of the I/O memory is overlaid with two logical uses: a receiver channel; and a transmitter tx_opcode block. This tx_opcode block, includes a jump tx_opcode pointing to the requested block in the I/O memory, and other tx_opcodes that form the header to guide the packet back to the requester.

This datapipe transfer receipt method improves the verification of transfer completion over the existing methods in following ways:

1. This method releases the local central processing unit, direct memory access or any on-chip peripherals from having to be directly involved in verification of data transfers. This frees up more cycles to process the application data.

2. For systems that currently do not verify transfer completion, the datapipe receipt method improves system synchronization/reliability during operation and speeds up system debug during development.

What is claimed is:

1. A data routing unit comprising:
a data receiver;
a data transmitter;
a bridge circuit connected to supply data to said data receiver and to receive data from said data transmitter, said bridge circuit connected to at least one set of data input lines and at least one set of data output lines, said bridge circuit responsive to a header of a data packet received from said data transmitter or received from said at least one set of data input lines to selectively route said received data packet to (1) said data receiver, (2) a selected set of said at least one set of data output lines, or (3) both said data receiver and a selected set of said at least one set of data output lines dependent upon said header;
an input/output memory connected to said data receiver for storing data received by said data receiver and to said data transmitter for storing data to be transmitted by said data transmitter, said input/output memory further storing transmitter scripts for controlling data transmission by said data transmitter;
said data receiver generating an interrupt to said data transmitter to transmit predetermined response data upon detection of a predetermined receiver event signaled in said data packet; and
said data transmitter executing a transmitter script stored at a predetermined location within said input/output memory upon interruption by said data receiver.

2. The data routing unit of claim 1, wherein:
said data transmitter transmits a transmitter receipt signal back to a source of said data packet upon detection of said predetermined receiver event.

3. The data routing unit of claim 1, wherein:
said data receiver stores a portion of said received data packet as a transmitter script at said predetermined location within said input/output memory.

4. The data routing unit of claim 1, wherein:
said data receiver stores a portion of said received data packet at said predetermined location within said input/output memory as a pointer to a transmitter script; and
upon receipt of said interrupt said data transmitter executes said transmitter script located within said input/output memory corresponding to said pointer.

* * * * *